US010387128B2

(12) United States Patent
Shahid et al.

(10) Patent No.: US 10,387,128 B2
(45) Date of Patent: Aug. 20, 2019

(54) METHOD AND APPARATUS FOR COMPILING COMPUTER-READABLE COMPUTER PROGRAMS USING EXTENDED ISOMORPHISM

(71) Applicant: Advanced Micro Devices, Inc., Sunnyvale, CA (US)

(72) Inventors: Md Asghar Ahmad Shahid, Giridih (IN); Shivarama Kokrady Rao, Bangalore (IN); Dibyendu Das, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 145 days.

(21) Appl. No.: 15/499,018

(22) Filed: Apr. 27, 2017

(65) Prior Publication Data

US 2018/0314506 A1 Nov. 1, 2018

(51) Int. Cl.
*G06F 9/44* (2018.01)
*G06F 8/41* (2018.01)

(52) U.S. Cl.
CPC ............ *G06F 8/4452* (2013.01); *G06F 8/443* (2013.01)

(58) Field of Classification Search
USPC .................................................. 717/140–158
See application file for complete search history.

(56) References Cited

U.S. PATENT DOCUMENTS

2008/0295071 A1* 11/2008 Schellekens ........ G06F 11/3447
717/106
2009/0171919 A1* 7/2009 Eichenberger .......... G06F 8/456

OTHER PUBLICATIONS

Larsen, Samuel et al.; Exploiting Superword Level Parallelism with Multimedia Instruction Sets; PLDI; 2000.
Porpodas, Vasileios et al.; PSLP: Padded SLP Automatic Vectorization; Proceedings of the 13th Annual IEEE/ACM International Symposium on Code Generation and Optimization; Feb. 2015.
Shin, Jaewook et al.; Superword-Level Parallelism in the Presence of Control Flow; Proceedings of the international symposium on Code generation and optimization; Mar. 2005.
Mabe, David Michael; A Bottom-Up SLP Vectorization Pass Starting from Associative Reduction Chains Implemented in LLVM; May 26, 2015.
Nuzman, Dorit et al.; Auto-Vectorization of Interleaved Data for SIMD; Proceedings of the 2006 PLDI Conference; Jun. 2006.
Lattner, Chris et al.; LLVM: A Compilation Framework for Lifelong Program Analysis & Transformation; Proceedings of the 2004 International Symposium on Code Generation and Optimization; Mar. 2004.

(Continued)

*Primary Examiner* — Chuck O Kendall
(74) *Attorney, Agent, or Firm* — Faegre Baker Daniels LLP (57) ABSTRACT

A method and apparatus provides for compiling a computer-readable computer program having a plurality of computer-readable statements into a plurality of computer-executable instructions. In one example, the method and apparatus determines when at least one pair of the computer-readable statements is partial-isomorphic having an equivalent operation and same order of operation but causing non-consecutive memory accesses, and generates the computer-executable instructions causing the at least one pair of the partial-isomorphic statements to perform sequential physical memory accesses.

20 Claims, 9 Drawing Sheets

(56) References Cited

OTHER PUBLICATIONS

Rosen, I. et al. Loop-aware SLP in GCC; GCC Developers Summit; Jul. 2007.
Bachmann, Olaf et al.; Chains of Recurrences—a method to expedite the evaluation of closed-form functions; ACM Proc. of the International Conference on Symbolic and Algebraic Computation (ISSAC); Jul. 1994.

* cited by examiner

```
600a ──┐ For( i = 0; I < n; i++ )          600b ──┐ for( i = 0; I < n; i++ )
        {                                          {
132a ──┐ c[i+0] = a[i+2] + b[i+0]         132b ──┐ c[i+1] = a[i+0] + b[i+0]
         c[i+1] = a[i+0] + b[i+2]                  c[i+3] = a[i+1] + b[i+1]
         c[i+2] = a[i+3] + b[i+1]                  c[i+0] = a[i+2] + b[i+2]
         c[i+3] = a[i+1] + b[i+3]                  c[i+2] = a[i+3] + b[i+3]
        }                                          }
```

METHOD AND APPARATUS FOR COMPILING COMPUTER-READABLE COMPUTER PROGRAMS USING EXTENDED ISOMORPHISM

BACKGROUND OF THE DISCLOSURE

The disclosure relates generally to a method and apparatus for compiling computer-readable computer programs, and more particularly to a compiler for compiling program codes or statements.

Recently, the need to increase performance and power efficiency in modern processors has led to a wide adoption of Single Instruction Multiple Data (SIMD) vector units found in graphics processing units (e.g., GPUs) and other processors. Most vendors support vector instructions and the trend is pushing the vector instructions to become wider and more powerful. However, writing code that makes efficient use of these vector units is difficult and leads to platform-specific implementations. Compiler-based automatic vectorization is one solution for this problem.

The automatic vectorization is a process of taking a scalar code and converting it to vector format as much as possible and profitable, according to a predetermined cost model. Specifically, a Superword Level Parallelism (SLP) vectorization algorithm is a primary way to automatically generate vector codes starting from straight-line scalar codes. The SLP vectorization algorithm is typically implemented in compilers, including GNU Compiler Collection (GCC) and Low Level Virtual Machine (LLVM).

SLP utilizes a SIMD capability of processor architectures. Specifically, SLP relies on finding sequences of isomorphic instructions to pack together into vectors. However, isomorphic code sequences are not common in practice. SLP needs isomorphic operations along with consecutive memory accesses to be efficient. Thus, there has been attempts to improve isomorphism where a sequence of instructions are not exactly isomorphic even if it is semantically isomorphic, such as the use of "SHIFT" instructions in place of "MUL" or introducing redundant instruction. The isomorphism generally refers to a similarity between program statements having the equivalent operation and same order of operation, causing consecutive memory accesses. Conversely, non-isomorphism generally refers to a similarity between program statements having the equivalent operation and same order of operation, but causing non-consecutive memory accesses.

Conventional solutions to improve isomorphism include techniques of packing and unpacking of non-consecutive memory accesses, or keeping the accesses scalar. However, keeping the accesses scalar does not utilize the SIMD capabilities of the processors and the packing and unpacking techniques increase operational expenses, minimizing an overall benefit of vectorization. Further, these attempts to improve the isomorphism in the presence of control flow have been unsuccessful due to an architectural requirement supporting predicated execution. A design of an instruction set to support the predicated execution can be difficult.

Another source of non-isomorphism comes from non-consecutive memory accesses by computer programs, where actual memory layout may not be non-consecutive. This tends to make SLP less effective due to non-consecutive memory accesses during operation. An existing solution is to either apply packing and unpacking of the non-consecutive memory accesses or keep them scalar. Again, keeping the memory access scalar does not utilize the SIMD capabilities of the processors, and the packing and unpacking instructions require additional execution costs which minimize an overall benefit of vectorization.

Accordingly, there exists a need for improved method and apparatus for compiling computer-readable computer programs in order to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Briefly, in one example, a method and apparatus provides for compiling a computer-readable computer program having a plurality of computer-readable statements into a plurality of computer-executable instructions. The method and apparatus determines when at least one pair of the computer-readable statements is partial-isomorphic having an equivalent operation and same order of operation but causing non-consecutive memory accesses, and generates the computer-executable instructions causing the at least one pair of the partial-isomorphic statements to perform sequential physical memory accesses. In one example, the equivalent operation relates to similar operands, such as "SHIFT" and "MUL."

Among other advantages, for example, the method and apparatus provides extended isomorphism in the presence of non-consecutive memory accesses during compilation of the computer-readable computer program, thereby improving the SLP efficiency. Instead of limiting the SLP vectorization algorithm to the consecutive memory accesses only, the method and apparatus identify missed opportunities for vectorization that can be extended, and perform an analysis of the non-consecutive memory accesses to improve an execution speed and performance.

In one example, the method and apparatus identifies, in a basic block of the computer program, at least one pair of partial-isomorphic statements having the equivalent operation and same order of operation but causing non-consecutive memory accesses. In response to identifying the at least one pair of partial-isomorphic statements, the non-consecutive memory accesses of the partial-isomorphic statements is analyzed to determine if an actual layout of memory accesses associated with the at least one pair of partial-isomorphic statements is consecutive in physical memory.

In one embodiment, in response to analyzing the non-consecutive memory accesses of the partial-isomorphic statements, a sequence of memory accesses associated with the at least one pair of partial-isomorphic statements is sorted as consecutive based on the actual layout of memory accesses in physical memory such that the sequence of memory accesses corresponds to the actual layout of memory accesses in the physical memory. Prior to generating the computer-executable instructions, the at least one pair of partial-isomorphic statements is marked as extended-isomorphic when the actual layout of memory accesses in physical memory is determined to be consecutive. The computer-executable instructions are generated causing the at least one pair of the partial-isomorphic statements marked as extended-isomorphic to perform sequential physical memory accesses.

In another example, the method and apparatus performs an analysis of the non-consecutive memory accesses in the computer program, and investigates an actual layout of the memory accesses in physical memory before failing to vectorize. For example, scalar evolution analysis (SEA) is performed over the memory accesses and a sorting over the analyzed statements proves that the non-consecutive memory accesses by the computer program as consecutive if the actual layout of the memory accesses in physical memory is consecutive. The SEA refers to a technique to analyze how a variable is accessed or evolved inside a loop, which is generally used to identify induction variables and a trip count of the loop for various optimization purposes. As a result of the analysis, additional computer-readable statements in the computer program are qualified for vectorization. Thus, the proposed techniques can extend the isomorphism and improve the SLP efficiency for parallel processing. Other advantages will be recognized by those of ordinary skill in the art.

In one example, the method and apparatus identifies, in a basic block of the computer program, at least one pair of partial-isomorphic statements having the equivalent operation (e.g., similar operations, such as "SHIFT" and "MUL") and same order of operation but causing non-consecutive memory accesses. In response to identifying the at least one pair of partial-isomorphic statements, the method and apparatus determines if an actual layout of memory accesses associated with the at least one pair of partial-isomorphic statements is consecutive in physical memory by analyzing the non-consecutive memory accesses of the partial-isomorphic statements. For example, an offset of each of the non-consecutive memory access is collected relative to a base pointer in physical memory to analyze the actual layout of memory accesses.

In response to determining if the actual layout of memory accesses is consecutive in physical memory, the method and apparatus sorts a sequence of memory accesses associated with the at least one pair of partial-isomorphic statements as consecutive based on the actual layout of memory accesses in physical memory. For example, the sorting is performed on the collected offsets using a reference table having pointers associated with the statements based on corresponding memory addresses. Then, the method and apparatus marks the at least one pair of partial-isomorphic statements as extended-isomorphic (e.g., using a flag or reference table) when the actual layout of memory accesses in physical memory is determined to be consecutive.

In one example, the method and apparatus combines the at least one pair of partial-isomorphic statements marked as extended-isomorphic into a plurality of operation packs based on an operation type. For example, one operation pack includes "STORE" operations only, or another operation pack includes "LOAD" operations only. The method and apparatus groups the plurality of combined operation packs which can be scheduled for subsequent execution, and generates the computer-executable instructions for each of the plurality of combined operation packs and generates a sorting instruction of an operation sequence associated with the plurality of combined operation packs. For example, the sorting instruction is generated with a mask computed using the program order of memory accesses for rearranging the marked statements. In relation to the operation sequence associated with the plurality of combined operation packs, the combining the at least one pair of partial-isomorphic statements is performed recursively or iteratively.

Figure 1:
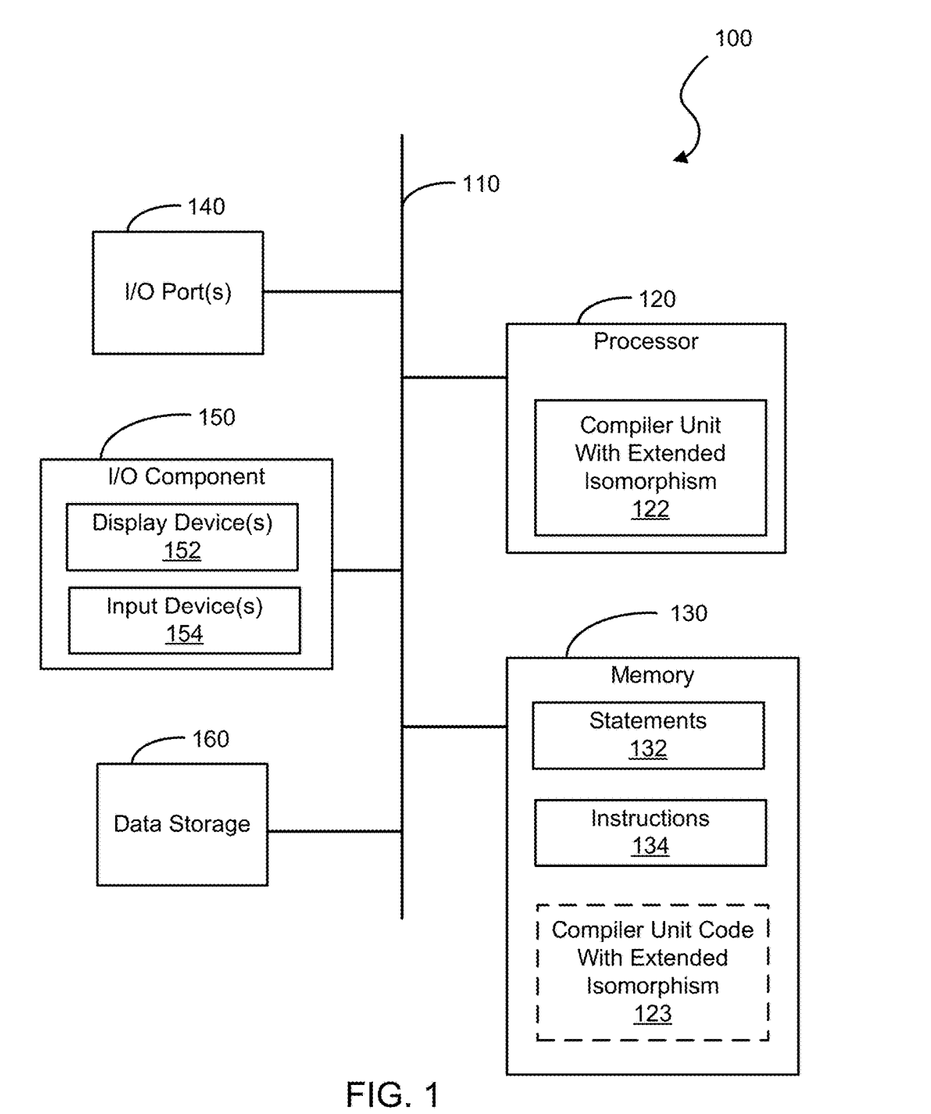
FIG. 1 is a schematic block diagram illustrating one example of an apparatus for compiling computer-readable computer programs in accordance with one embodiment set forth in the disclosure.

FIG. 1 illustrates one example of an apparatus 100 for compiling a computer-readable computer program, in accordance with embodiments of the disclosure. In some implementations, the apparatus 100 includes any type of computing device suitable for implementing aspects of embodiments of the disclosed subject matter. Examples of computing devices include such "workstations," "servers," "laptops," "desktops," "tablet computers," "hand-held devices," "game consoles," "general-purpose graphics processing units (GPGPUs)," "APUs," "GPUs," and the like, all of which are contemplated within the scope of FIG. 1, with reference to various components of the system 100 and/or apparatus 100.

In one embodiment, the apparatus 100 includes a bus 110 that, directly and/or indirectly, couples the following devices: a processor 120, a memory 130, an input/output (I/O) port(s) 140, an I/O component(s) 150, and a data storage 160, such as a non-transitory storage medium. Any number of additional components, different components, and/or combinations of components is also included in the apparatus 100. In some implementations, the I/O component(s) 150 include a presentation component configured to present information to a user such as, for example, a display device, a speaker, a printing device, and/or the like, and/or an input component such as, for example, a microphone, a joystick, a satellite dish, a scanner, a printer, a wireless device, a keyboard, a pen, a voice input device, a touch input device, a touch-screen device, an interactive display device, a mouse, and/or the like.

The bus 110 represents one or more busses (such as, for example, an address bus, data bus, or combination thereof). Similarly, in some embodiments, the apparatus 100 includes a number of processors 120, a number of memory components 130, a number of I/O ports 140, a number of I/O components 150, and/or a number of storages 160. Additionally any number of these components, or combinations thereof, is distributed and/or duplicated across a number of computing devices.

In this example, the processor 120 includes a compiler unit with extended isomorphism 122 that is configured to compile the computer-readable computer program having a plurality of computer-readable statements into a plurality of computer-executable instructions in accordance with one embodiment set forth in the disclosure. In one embodiment, the memory 130 includes computer-readable media in the form of volatile and/or nonvolatile memory. In other embodiments, the memory 130 is removable, nonremovable, or a combination thereof.

Media examples include Random Access Memory (RAM); Read Only Memory (ROM); Electronically Erasable Programmable Read Only Memory (EEPROM); flash memory; optical or holographic media; magnetic cassettes, magnetic storage devices; and/or any other medium that can be used to store information and can be accessed by a computing device such as, for example, quantum state memory, and/or the like. A distributed memory system shared in one or more servers (e.g., web servers or non-web servers) is also contemplated to suit different applications.

In this example, the memory 130 stores computer-readable statements 132 of the computer program to be compiled, and computer-executable instructions 134 for causing the processor 120 to implement aspects of embodiments of system components discussed herein and/or to perform aspects of embodiments of methods and procedures discussed herein. During compilation of the computer program, compiler unit code with extended isomorphism 123 generated by the compiler unit with extended isomorphism 122 temporarily resides in the memory 130 for processing the statements 132 and the instructions 134. Further, the statements 132 and instructions 134 are transmitted between and stored on the data storage 160 and/or the memory 130 via the bus 110, as desired.

The computer-executable instructions 134 include, for example, computer code, machine-useable instructions, and the like such as, for example, program components capable of being executed by one or more processors 120 associated with the apparatus 100. Program components are programmed using any number of different programming environments, including various languages, development kits, frameworks, and/or the like. Some or all of the functionality contemplated herein are also, or alternatively, implemented in hardware and/or firmware.

The illustrative apparatus 100 shown in FIG. 1 is not intended to suggest any limitation as to the scope of use or functionality of embodiments of the present disclosure. Neither should the illustrative apparatus 100 be interpreted as having any dependency or requirement related to any single component or combination of components illustrated therein. Additionally, various components depicted in FIG. 1 are, in embodiments, integrated with various ones of the other components depicted therein (and/or components not illustrated), all of which are considered to be within the ambit of the present disclosure.

Figure 2:
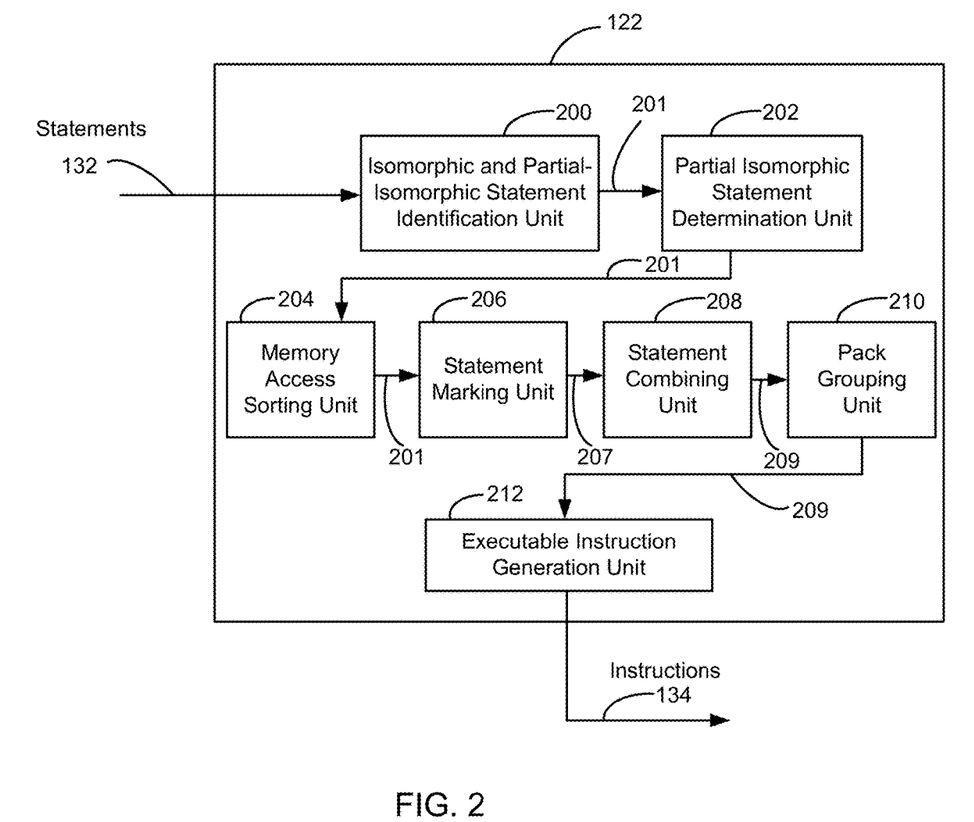
FIG. 2 is a block diagram illustrating the apparatus for compiling the computer-readable computer programs shown in FIG. 1.

FIG. 2 illustrates an exemplary compiler unit with extended isomorphism 122. Embodiments of the present disclosure are described below by way of example only, with reference to the accompanying drawings. Further, the following description is merely exemplary in nature and is in no way intended to limit the disclosure, its application, or uses. As used herein, the term "unit" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

Referring now to the example shown in FIGS. 1 and 2, the compiler unit with extended isomorphism 122 includes an isomorphic and partial-isomorphic statement identification unit 200, a partial isomorphic statement determination unit 202, a memory access sorting unit 204, a statement marking unit 206, a statement combining unit 208, a pack grouping unit 210, and an executable instruction generation unit 212. Although these sub-units 200-212 are illustrated as children units subordinate of the parent unit, each sub-unit can be operated as a separate unit from the compiler unit 122, and other suitable combinations of sub-units are contemplated to suit different applications. In another embodiment, one or more units can be selectively bundled as a key software model running on the processor having software as a service (SSaS) features.

In this example, the compiler unit with extended isomorphism 122 is configured to compile a computer-readable computer program having a plurality of computer-readable statements 132 into a plurality of computer-executable instructions 134, using extended isomorphism. More specifically, the isomorphic and partial-isomorphic statement identification unit 200 is configured to obtain one or more computer-readable statements 132 from memory 130, and to identify, in a basic block of the computer program, at least one pair of partial-isomorphic or isomorphic statements 201. The partial-isomorphic statements refer to computer-readable statements having the equivalent operation and same order of operation but causing non-consecutive memory accesses. The isomorphic statements refer to computer readable statements having the equivalent operation and same order of operation and causing consecutive memory accesses.

In one example, the isomorphic and partial-isomorphic statement identification unit 200 utilizes straight-line code vectorizers, such as the SLP vectorization algorithm, to identify the partial-isomorphic or isomorphic statements. In this example, the isomorphic and partial-isomorphic statement identification unit 200 identifies sequences of scalar instructions that are repeated multiple times in a computer program, and combine them together into vector instructions. Some implementation methods are confined to codes (or statements) within a single basic block of the computer program, but other implementation methods follow a single path across multiple basic blocks, as long as each group of instructions to be vectorized belongs to the same basic block.

Using the SLP vectorization algorithm, for example, in the basic block, one or more pairs of isomorphic statements are identified from the code. As discussed above, the isomorphic statements refer to the computer-readable statements of the computer program containing similar operators in same order and accessing consecutive memory. The SLP algorithm collects operation instructions that are seeds for vectorization. The seeds refer to the instructions of the same kind, the instructions accessing adjacent memory locations, and the instructions forming a reduction and independent instructions and the like.

Starting from the seeds, the isomorphic and partial-isomorphic statement identification unit 200 forms one or more vectorizable groups using the isomorphic pairs, and identifies the vectorizable groups which can be scheduled. The isomorphic and partial-isomorphic statement identification unit 200 analyzes a cost of vectorized instructions in comparison with scalar instructions, and generates the vectorized (or simdized) instructions if the cost of vectorized instructions is below a predetermined threshold.

The isomorphic and partial-isomorphic statement identification unit 200 determines when at least one pair of the computer-readable statements is partial-isomorphic having an equivalent operation and same order of operation but causing non-consecutive memory accesses. If the statements in the basic block are accessing non-consecutive memory, the statements are considered as non-isomorphic in spite of the same operation and same order of operation.

For example, when "LOAD" and/or "STORE" operations of memory streams are occurring in a disorderly manner, the statements in the basic block perform non-consecutive memory accesses although an actual or physical layout of the memory accesses is consecutive. This reduces the opportunities for vectorization. Conventional SLP vectorization algorithms skip or omit these non-isomorphic statements without processing for the vectorization.

In contrast, the partial isomorphic statement determination unit 202 is configured to determine, in response to identifying the at least one pair of partial-isomorphic statements, if the actual layout of memory accesses associated with the at least one pair of partial-isomorphic statements 201 is consecutive in physical memory 130 by analyzing the non-consecutive memory accesses of the partial-isomorphic statements. For example, the partial isomorphic statement determination unit 202 applies the scalar evolution analysis (SEA) to collect an offset of each of the non-consecutive memory accesses relative to a base location in physical memory 130 for analyzing the actual layout of memory accesses. The partial isomorphic statement determination unit 202 compares the collected offsets and check if they are consecutive in physical memory 130.

Figure 10:
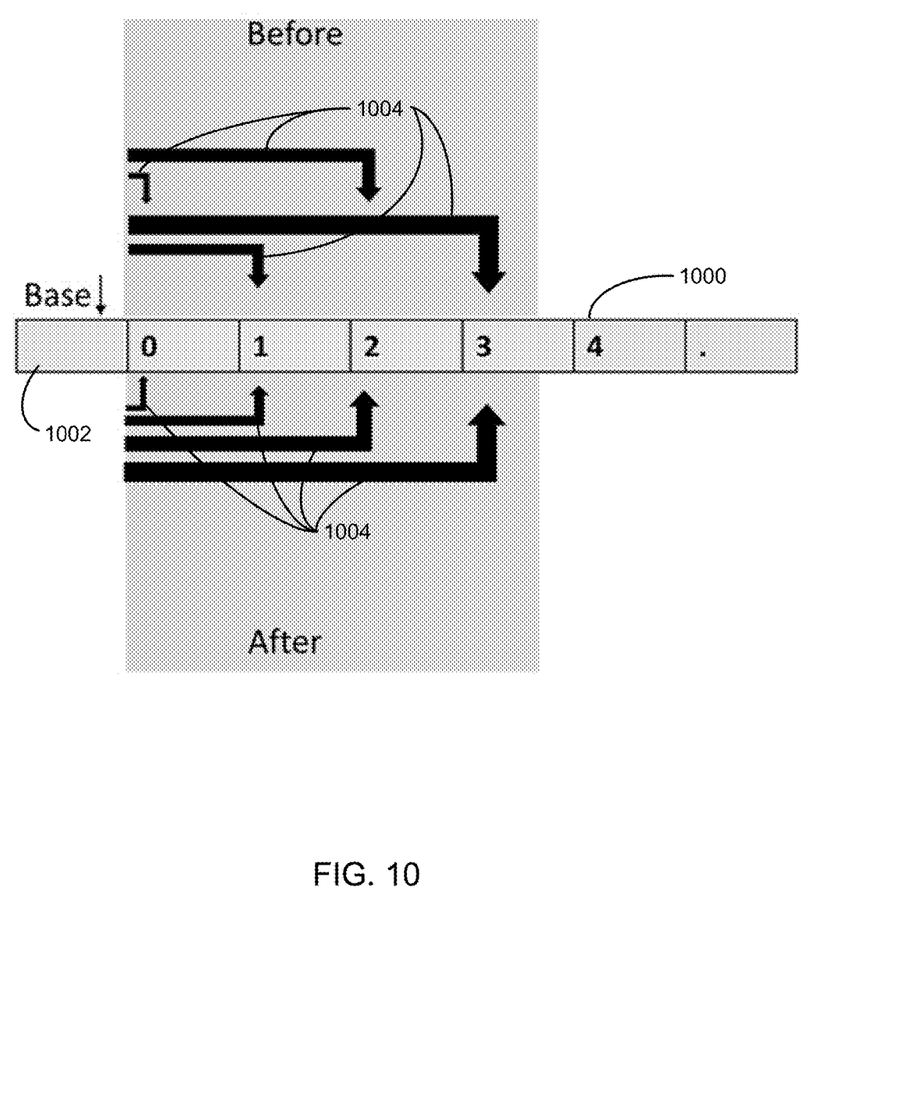
FIG. 10 is an exemplary pictorial representation of an exemplary sorting method using a base pointer in accordance with one embodiment set forth in the disclosure.

The memory access sorting unit 204 is configured to sort, in response to determining if the actual layout of memory accesses is consecutive in physical memory 130, a sequence of memory accesses associated with the at least one pair of partial-isomorphic statements 201 as consecutive based on the actual layout of memory accesses in physical memory 130. For example, the sorting is performed using a reference table having pointers associated with the statements 201 based on corresponding memory addresses. FIG. 10 illustrates an exemplary sorting method using a base pointer. For a given array or memory buffer 1000, there will be a base pointer 1002. From this base pointer 1002, all offsets 1004 of the accessed array elements or memory objects are collected. The sorting is performed on the collected offsets 1004. FIG. 10 shows the offsets 1004 by bold arrows before and after sorting. In FIG. 10, before sorting the offsets 1004 from the base pointer 1002, different memory accesses are of variable length, indicating non-consecutive memory accesses. However, after sorting, the offsets 1004 are sorted such that the memory accesses are performed sequentially based on the corresponding memory addresses.

The statement marking unit 206 is configured to mark, prior to generating the computer-executable instructions 134, the at least one pair of partial-isomorphic statements 201 as extended-isomorphic when the actual layout of memory accesses in physical memory 130 is determined to be consecutive. For example, a flag or a reference table is used to mark the statements 201 as extended-isomorphic, but other suitable methods, such as pointers, are also contemplated to suit different applications. Thus, unlike the conventional algorithms, both isomorphic and partial-isomorphic statements in the basic block now become qualified for the vectorization, thereby increasing an overall benefit of parallel processing associated with the SIMD processor architecture.

The statement combining unit 208 is configured to combine the at least one pair of partial-isomorphic statements marked as extended-isomorphic 207 into a plurality of operation packs 209 based on an operation type. For example, one operation pack includes "STORE" operations only, or another operation pack includes "LOAD" operations only. Various other operations, such as "ADD" or "SHIFT" operation, are grouped or combined as an independent operation pack. Other suitable arrangements are also contemplated to suit different applications.

The pack grouping unit 210 is configured to group the plurality of combined operation packs 209 which can be scheduled for subsequent execution. The executable instruction generation unit 212 is configured to generate the computer-executable instructions 134 based on the combined operation packs 209, causing the at least one pair of the partial-isomorphic statements 201 to perform sequential physical memory accesses.

Figure 3:
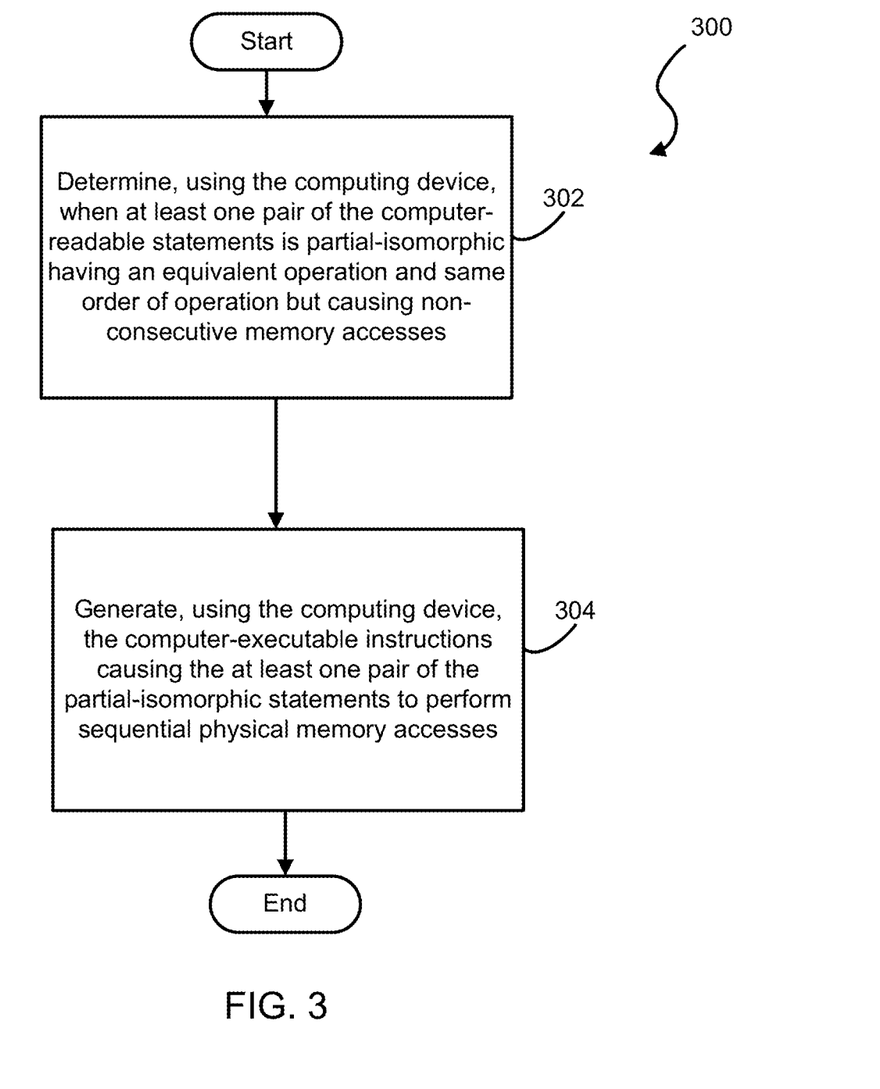
FIG. 3 is a flowchart illustrating one example of a method for compiling the computer-readable computer programs in accordance with one embodiment set forth in the disclosure.

FIG. 3 illustrates one example of a method 300 for compiling a computer-readable computer program having a plurality of computer-readable statements into a plurality of computer-executable instructions. It will be described with reference to FIGS. 1 and 2. However, any suitable structure can be employed.

In operation, at block 302, the compiler unit with extended isomorphism 122 determines when at least one pair of the computer-readable statements is partial-isomorphic having an equivalent operation (e.g., similar operations, such as "SHIFT" and "MUL") and same order of operation but causing non-consecutive memory accesses. At block 304, the compiler unit with extended isomorphism 122 generates the computer-executable instructions causing the at least one pair of the partial-isomorphic statements to perform sequential physical memory accesses. The blocks 302 and 304 are further illustrated in FIGS. 4 and 5.

Figure 4:
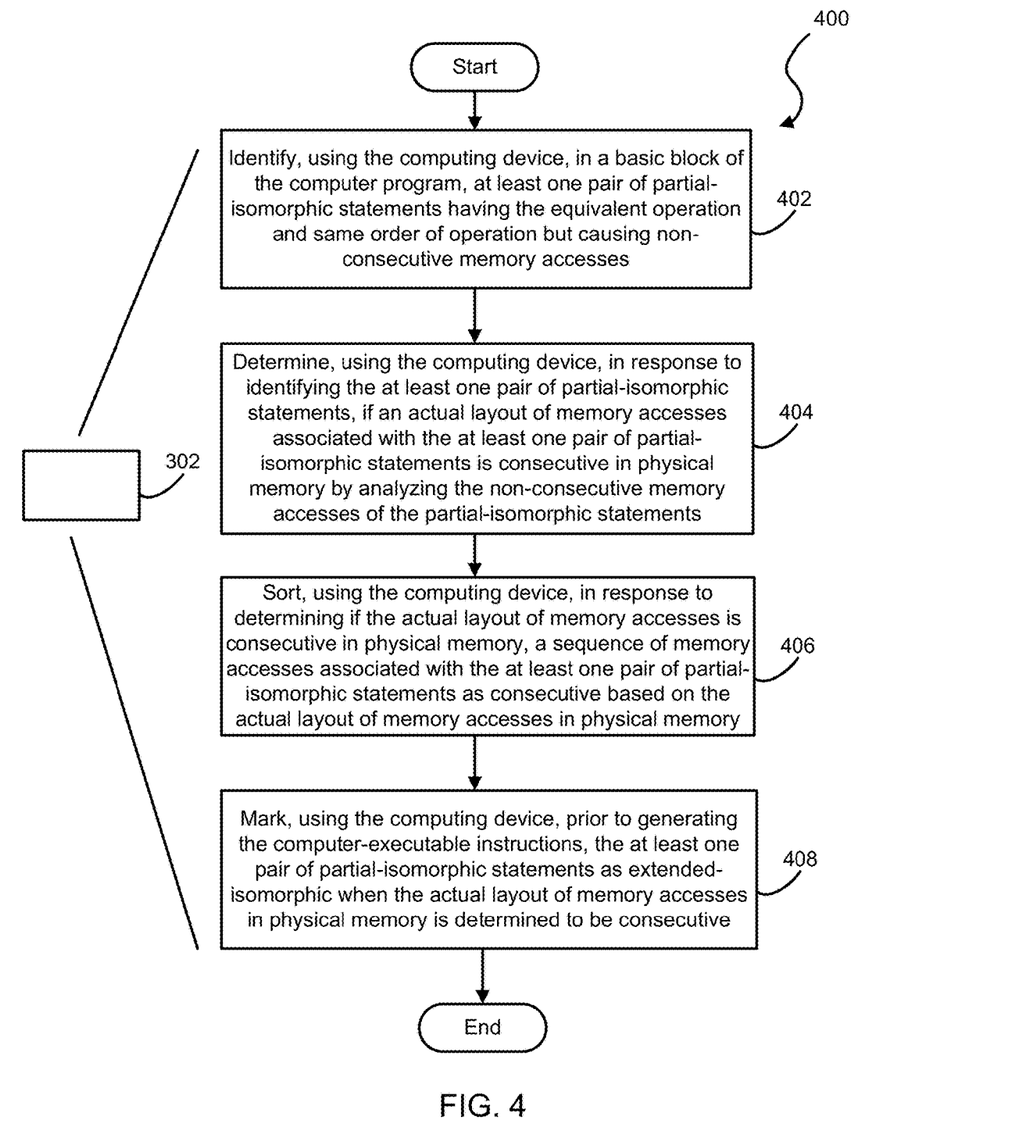
FIG. 4 is a flowchart illustrating another example of the method for compiling the computer-readable computer programs.

FIG. 4 illustrates one example of a method 400 for performing block 302 of FIG. 3 in accordance with one embodiment set forth in the disclosure. It will be described with reference to FIGS. 1-3. However, any suitable structure can be employed. Although four sub-blocks 402-408 are illustrated, other suitable sub-blocks can be employed to suit different applications. In operation, at block 402, the isomorphic and partial-isomorphic statement identification unit 200 identifies, in a basic block of the computer program, one or more pairs of isomorphic statements and/or one or more pairs of partial-isomorphic statements due to non-consecutive memory accesses.

Figure 6A:
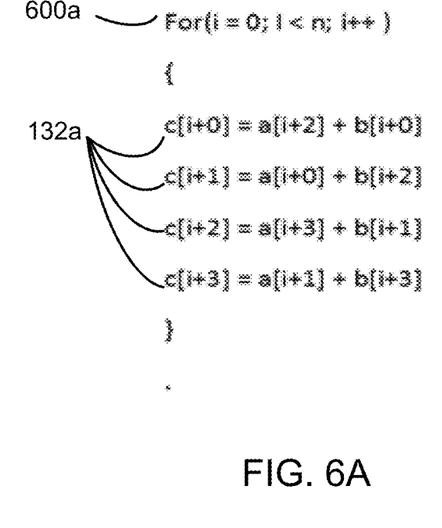
FIGS. 6A-B are exemplary basic blocks of the computer-readable computer programs having a plurality of computer-readable statements in accordance with one embodiment set forth in the disclosure.
Figure 6B:
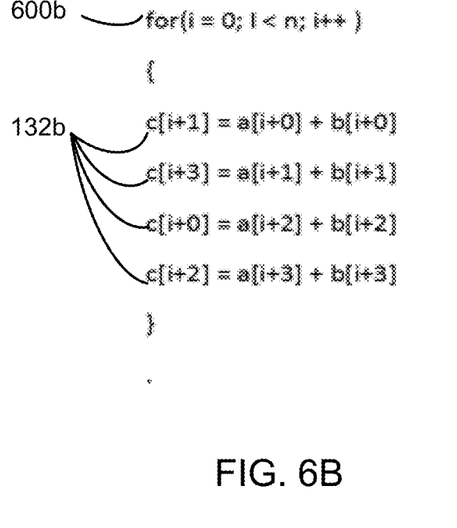

FIGS. 6A-6B illustrate two exemplary basic blocks 600a, 600b of the computer-readable computer programs, each block having a plurality of computer-readable statements 132a, 132b. In FIG. 6A, a first basic block 600a is shown having a "FOR" loop including four statements 132a. In the first basic block 600a, all four statements 132a have the same "STORE" ("=") operations (i.e., c[i+0], c[i+1], c[i+2], c[i+3]) with the same order of operation. In this example, when an induction variable "i" of the "FOR" loop is equal to zero, "STORE" c[0], c[1], c[2], c[3] operations are performed sequentially in the same order with respect to their index value (e.g., from index 0 to index 3).

However, the "LOAD" operations perform non-consecutive memory accesses for array members used in the basic block 600a. In this example, an "A" array members (i.e., a[i+2], a[i+0], a[i+3], a[i+1]) and a "B" array members (i.e., b[i+0], b[i+2], b[i+1], b[i+3]) are accessed out of sequence with respect to their index values. For example, when the induction variable "i" of the "FOR" loop is equal to zero, a[2] is accessed first, a[0] is accessed next, a[3] is accessed next, and a[1] is accessed last, based on a sequence of the "ADD" ("+") statements 132a. Thus, in the first basic block 600a, the statements 132a are identified as partial-isomorphic due to non-consecutive memory accesses for the "A" and "B" array members.

In FIG. 6B, a second basic block 600b is shown having a "FOR" loop including four statements 132b. In the second basic block 600b, all four statements 132b have the same "LOAD" operations for both "A" and "B" arrays with the same order of operation. In this example, when the induction variable "i" of the "FOR" loop is equal to zero, "LOAD" a[0], a[1], a[2], a[3] operations are performed sequentially in the same order with respect to their index values (e.g., from index 0 to 3). Similarly, "LOAD" b[0], b[1], b[2], b[3] operations are also performed sequentially in the same order with respect to their index values.

However, the "STORE" operations perform non-consecutive memory accesses. In this example, when the induction variable "i" of the "FOR" loop is equal to zero, c[1] is accessed first, c[3] is accessed next, c[0] is accessed next, and c[2] is accessed last, based on a sequence of the statements 132b. Thus, in the second basic block 600b, the statements 132b are identified as partial-isomorphic due to non-consecutive memory accesses for the "C" array members. In conventional algorithms, these statements 132a and 132b are typically skipped or omitted without being processed for the vectorization.

Figure 7:
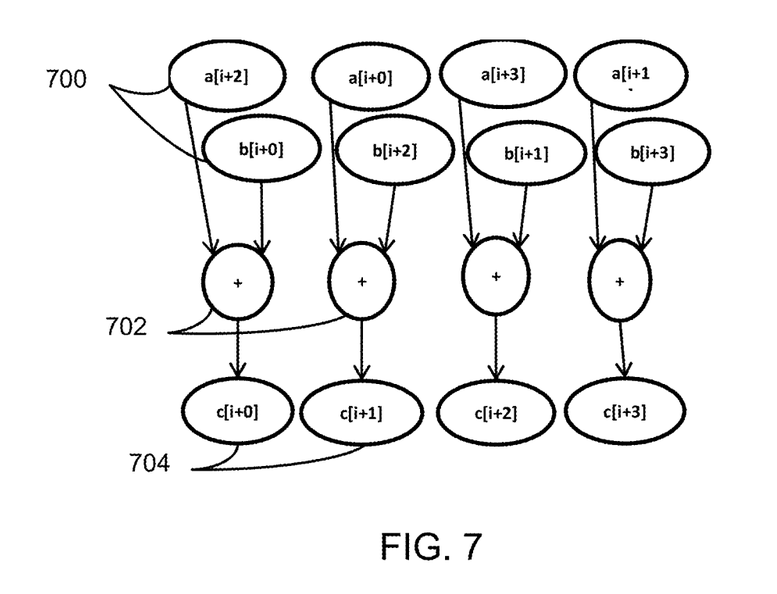
FIG. 7 is an exemplary dependency graph of the basic block shown in FIG. 6A.

FIG. 7 illustrates an exemplary dependency graph of the basic block 600a shown in FIG. 6A. In this example, each "LOAD" operation 700 accesses physical memory 130 to load a value from the memory into a corresponding array member (e.g., a[i+2] or b[i+0]). Each "ADD" ("+") operation 702 does not access physical memory 130 but calculates a summed value of at least two array members (e.g., a[i+2] or b[i+0]). Each "STORE" operation 704 accesses physical memory 130 to store the summed value (e.g., c[i+0]) into the memory.

Returning now to FIG. 4, proceeding to block 404, if the computer-readable statement is partial-isomorphic, the partial isomorphic statement determination unit 202 determines, in response to identifying the at least one pair of partial-isomorphic statements, if an actual layout of memory accesses associated with the at least one pair of partial-isomorphic statements is consecutive in physical memory 130 by analyzing the non-consecutive memory accesses of the partial-isomorphic statements 132.

If the actual layout of memory accesses is physically consecutive, at block 406, the memory access sorting unit 204 sorts, in response to determining if the actual layout of memory accesses is consecutive in physical memory, a sequence of memory accesses associated with the at least one pair of partial-isomorphic statements as consecutive based on the actual layout of memory accesses in physical memory 130. At block 408, the statement marking unit 206 marks, prior to generating the computer-executable instructions, the at least one pair of partial-isomorphic statements as extended-isomorphic when the actual layout of memory accesses in physical memory is determined to be consecutive.

Figure 5:
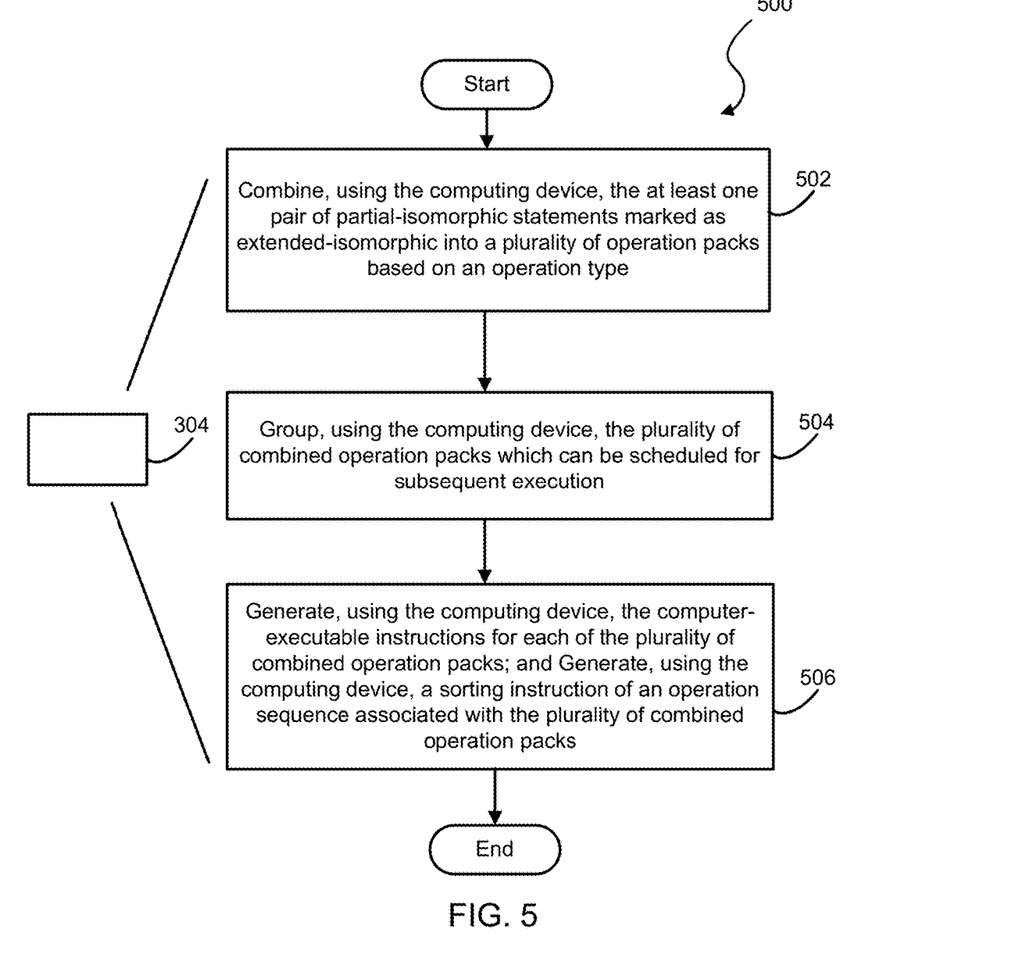
FIG. 5 is a flowchart illustrating still another example of the method for compiling the computer-readable computer programs.

FIG. 5 illustrates one example of a method 500 for performing block 304 of FIG. 3 in accordance with one embodiment set forth in the disclosure. It will be described with reference to FIGS. 1-3. However, any suitable structure can be employed. Although three sub-blocks 502-506 are illustrated, other suitable sub-blocks can be employed to suit different applications.

At block 502, the statement combining unit 208 combines at least one pair of partial-isomorphic statements marked as extended-isomorphic into a plurality of operation packs based on an operation type. In one embodiment, the statement combining unit 208 combines both the pairs of isomorphic statements and the pairs of extended isomorphic statements into their respective sets of operation packs based on the operation type. In one embodiment, the combining the at least one pair of isomorphic or partial-isomorphic statements is performed recursively or iteratively in relation to the operation sequence associated with the plurality of combined operation packs. At block 504, the pack grouping unit 210 groups the plurality of combined operation packs based on an execution schedule defined by a program order of memory accesses.

At block 506, the executable instruction generation unit 212 generates the computer-executable instructions 134, such as SIMD instructions, for each of the plurality of combined operation packs, and also generates a sorting (or shuffle/permute) instruction of an operation sequence associated with the plurality of combined operation packs if the packs are marked as extended-isomorphic. For example, the sorting instruction (or shuffle/permute) is generated with a mask computed using the program order of memory accesses for rearranging the marked statements.

Although the processing blocks illustrated in FIGS. 3-5 are illustrated in a particular order, those having ordinary skill in the art will appreciate that the processing can be performed in different orders to suit different applications. In one example, blocks 406 and 408 can be performed essentially simultaneously.

Figure 8:
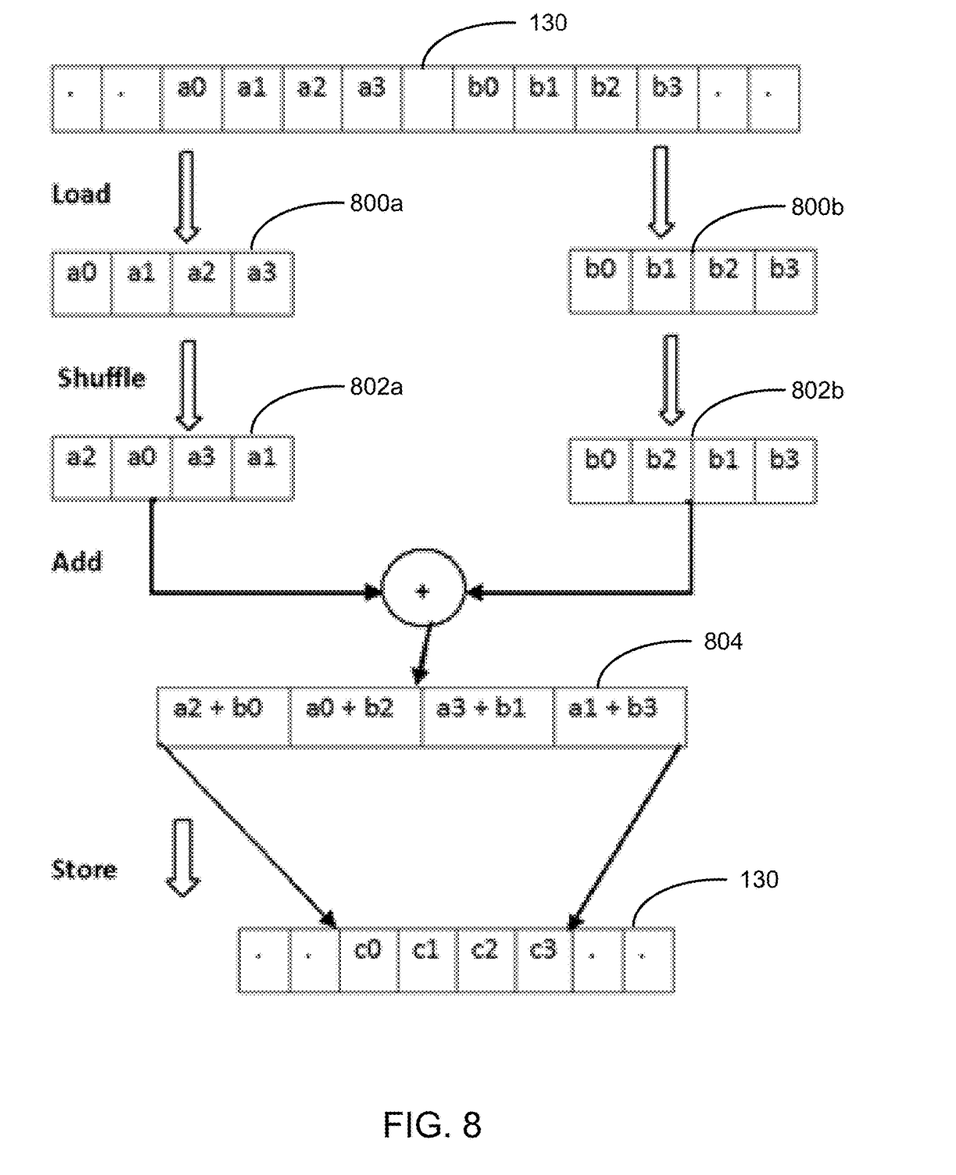
FIG. 8 is an exemplary pictorial representation of the method shown in FIG. 5 based on the basic block shown in FIG. 6A.

FIG. 8 illustrates an exemplary extended isomorphism of "LOAD" operation provided by the method shown in FIG. 3 based on the basic block shown in FIG. 6A. In FIG. 8, the "A" array members, a[0], a[1], a[2], a[3], are consecutively positioned in physical memory 130. Similarly, the "B" array members, b[0], b[1], b[2], b[3], are also contiguously arranged in physical memory 130. Thus, the partial isomorphic statement determination unit 202 determines that the actual layouts of memory accesses for both "A" and "B" array members are consecutive.

After proving the actual memory layout as consecutive, the memory access sorting unit 204 generates a vector register 800a, 800b for each array (e.g., "A" and "B" arrays). A sorting (or shuffle/permute) instruction of an operation is generated by the memory access sorting unit 204 based on a program order of memory accesses in the statements 132a in the first basic block 600a. Since a memory access sequence of the "C" array members is already consecutive in the first basic block 600a, no sorting instruction is needed. However, the memory access sequences of the "A" and "B" array member for the "LOAD" operation are not consecutive in the first basic block 600a. Thus, the sorting instructions 802a, 802b of the vector registers 800a, 800b are generated based on the program order of memory accesses in the statements 132a.

The statement marking unit 206 marks the partial-isomorphic statements 132a as extended-isomorphic, and the statement combining unit 208 combines the partial-isomorphic statements 132a marked as extended-isomorphic into a plurality of operation packs based on an operation type. Subsequently, the pack grouping unit 210 groups the plurality of combined operation packs based on an execution schedule defined by the program order of memory accesses in the statements 132a. The executable instruction generation unit 212 generates the sorting instruction of an operation sequence, and operation results 804 of the statements 132a are stored in the respective "C" array members in physical memory 130.

Figure 9:
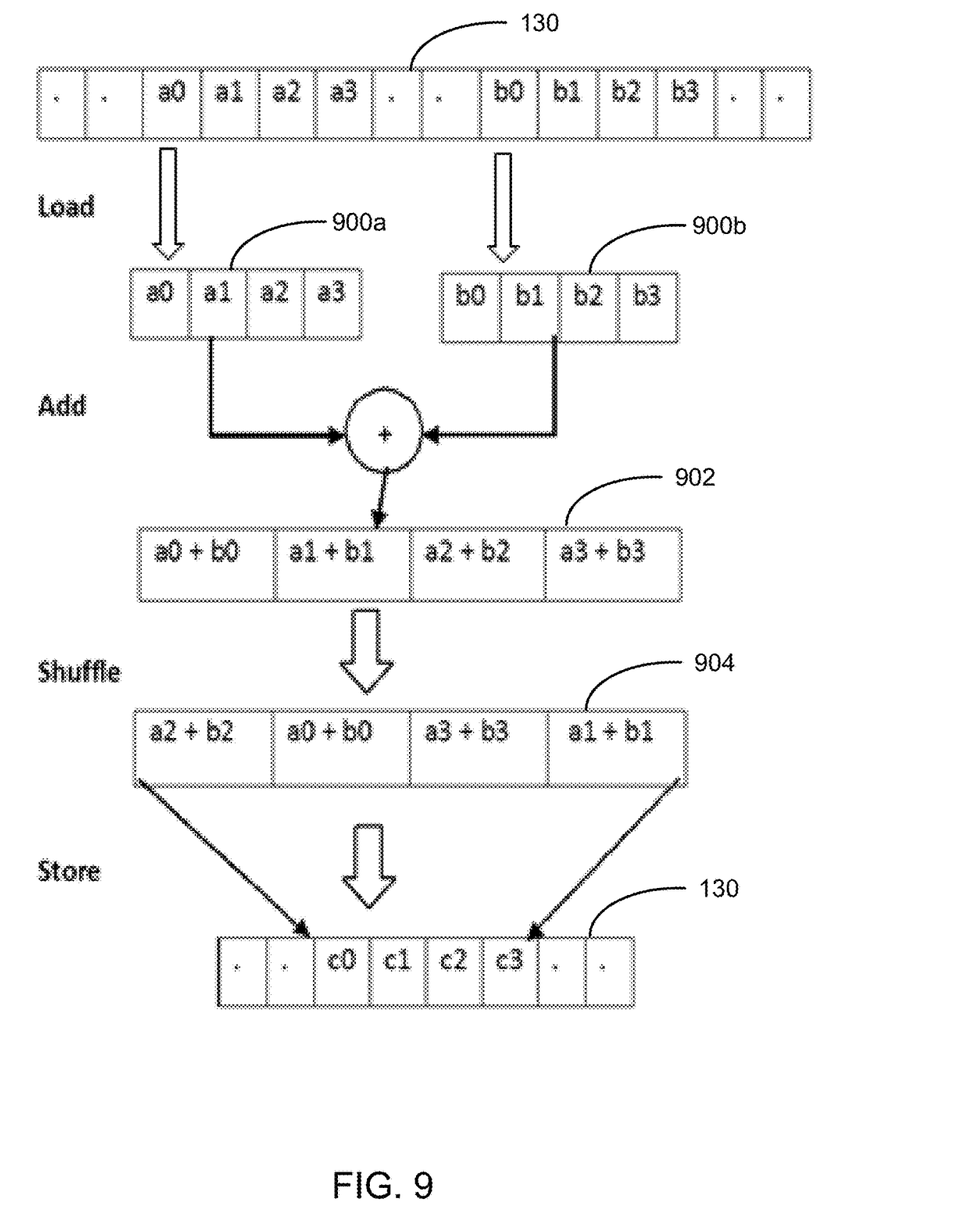
FIG. 9 is an exemplary pictorial representation of the method shown in FIG. 5 based on the basic block shown in FIG. 6B.

FIG. 9 illustrates an exemplary extended isomorphism of "STORE" operation provided by the method shown in FIG. 3 based on the basic block FIG. 6B. In FIG. 9, the "A" array members, a[0], a[1], a[2], a[3], are consecutively positioned in physical memory 130. Similarly, the "B" array members, b[0], b[1], b[2], b[3], are also contiguously arranged in physical memory 130. Thus, the partial isomorphic statement determination unit 202 determines that the actual layouts of memory accesses for both "A" and "B" array members are consecutive.

After proving the actual memory layout as consecutive, the memory access sorting unit 204 generates a vector register 900a, 900b for each array (e.g., "A" and "B" arrays). A sorting (or shuffle/permute) instruction of an operation is generated by the memory access sorting unit 204 based on a program order of memory accesses in the statements 132b in the second basic block 600b. Since the memory access sequences of the "A" and "B" array members are already consecutive in the second basic block 600b, no sorting instructions are needed. Operation results of the statements 132b are stored in another vector register 902. However, the memory access sequence of the "C" array member for the "STORE" operation is not consecutive in the second basic block 600b. Thus, the sorting instruction 904 of the operation results is generated based on the program order of memory accesses in the statements 132b.

The statement marking unit 206 marks the partial-isomorphic statements 132b as extended-isomorphic, and the statement combining unit 208 combines the partial-isomorphic statements 132b marked as extended-isomorphic into a plurality of operation packs based on an operation type. Subsequently, the pack grouping unit 210 groups the plurality of combined operation packs based on an execution schedule defined by the program order of memory accesses in the statements 132b. The executable instruction generation unit 212 generates the sorting instruction of an operation sequence, and sorted operation results are stored in the respective "C" array members in physical memory 130.

Among other advantages, for example, the extended isomorphism described above is beneficial for applications accessing physical memory in a disorderly manner, such as media compression applications, mathematical software, and the like. In certain cases, the method and apparatus described above provide a significant performance improvement, e.g., in the range of 5-10 percent performance increase on central processing units such as multi-CPU core processor platforms or any suitable processor.

The above detailed description of the present disclosure and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. A method, by a computing device, of compiling a computer-readable computer program having a plurality of computer-readable statements into a plurality of computer-executable instructions, comprising:
    determining, using the computing device, when at least one pair of the computer-readable statements is partial-isomorphic having an equivalent operation and same order of operation but causing non-consecutive memory accesses, wherein the equivalent operation includes store operations and wherein the store operations have the non-consecutive memory accesses; and
    generating, using the computing device, the computer-executable instructions causing the at least one pair of the partial-isomorphic statements to perform sequential physical memory accesses.

2. The method of claim 1, wherein the determining when at least one pair of the computer readable statements is partial-isomorphic comprises:
    identifying, using the computing device, in a basic block of the computer program, at least one pair of partial-isomorphic statements having the equivalent operation and same order of operation but causing non-consecutive memory accesses.

3. The method of claim 2, wherein the determining when at least one pair of the computer readable statements is partial-isomorphic comprises:
    determining, using the computing device, in response to identifying the at least one pair of partial-isomorphic statements, if an actual layout of memory accesses associated with the at least one pair of partial-isomorphic statements is consecutive in physical memory by analyzing the non-consecutive memory accesses of the partial-isomorphic statements.

4. The method of claim 3, wherein the determining when at least one pair of the computer readable statements is partial-isomorphic comprises:
    sorting, using the computing device, in response to determining if the actual layout of memory accesses is consecutive in physical memory, a sequence of memory accesses associated with the at least one pair of partial-isomorphic statements as consecutive based on the actual layout of memory accesses in physical memory.

5. The method of claim 4, wherein the determining when at least one pair of the computer readable statements is partial-isomorphic comprises:
    marking, using the computing device, prior to generating the computer-executable instructions, the at least one pair of partial-isomorphic statements as extended-isomorphic when the actual layout of memory accesses in physical memory is determined to be consecutive.

6. The method of claim 5, wherein the generating the computer-executable instructions comprises:
    combining, using the computing device, the at least one pair of partial-isomorphic statements marked as extended-isomorphic into a plurality of operation packs based on an operation type.

7. The method of claim 6, wherein the generating the computer-executable instructions comprises:
    grouping, using the computing device, the plurality of combined operation packs which can be scheduled for subsequent execution.

8. The method of claim 7, wherein the generating the computer-executable instructions comprises:
    generating, using the computing device, the computer-executable instructions for each of the plurality of combined operation packs; and
    generating, using the computing device, a sorting instruction of an operation sequence associated with the plurality of combined operation packs.

9. The method of claim 8, wherein the combining the at least one pair of partial-isomorphic statements is performed recursively or iteratively in relation to the operation sequence associated with the plurality of combined operation packs.

10. The method of claim 3, wherein determining if the actual layout of memory accesses is consecutive in physical memory comprises:
collecting, using the computing device, an offset of each of the non-consecutive memory accesses relative to a base location in physical memory for analyzing the actual layout of memory accesses in the physical memory.

11. A computing device having a processor operative to compile a computer-readable computer program having a plurality of computer-readable statements into a plurality of computer-executable instructions, the processor being configured to:
determine, using the computing device, when at least one pair of the computer-readable statements is partial-isomorphic having an equivalent operation and same order of operation but causing non-consecutive memory accesses, wherein the equivalent operation includes store operations and wherein the store operations have the non-consecutive memory accesses; and
generate, using the computing device, the computer-executable instructions causing the at least one pair of the partial-isomorphic statements to perform sequential physical memory accesses.

12. The computing device of claim 11, wherein the processor is further configured to:
identify, using the computing device, in a basic block of the computer program, at least one pair of partial-isomorphic statements having the equivalent operation and same order of operation but causing non-consecutive memory accesses.

13. The computing device of claim 12, wherein the processor is further configured to:
determine, using the computing device, in response to identifying the at least one pair of partial-isomorphic statements, if an actual layout of memory accesses associated with the at least one pair of partial-isomorphic statements is consecutive in physical memory by analyzing the non-consecutive memory accesses of the partial-isomorphic statements.

14. The computing device of claim 13, wherein the processor is further configured to:
sort, using the computing device, in response to determining if the actual layout of memory accesses is consecutive in physical memory, a sequence of memory accesses associated with the at least one pair of partial-isomorphic statements as consecutive based on the actual layout of memory accesses in physical memory.

15. The computing device of claim 14, wherein the processor is further configured to:
mark, using the computing device, prior to generating the computer-executable instructions, the at least one pair of partial-isomorphic statements as extended-isomorphic when the actual layout of memory accesses in physical memory is determined to be consecutive.

16. The computing device of claim 15, wherein the processor is further configured to:
combine, using the computing device, the at least one pair of partial-isomorphic statements marked as extended-isomorphic into a plurality of operation packs based on an operation type.

17. A non-transitory computer readable storage medium comprising executable instructions that when executed by one or more processors cause the one or more processors to:
determine, using the computing device, when at least one pair of the computer-readable statements is partial-isomorphic having an equivalent operation and same order of operation but causing non-consecutive memory accesses, wherein the equivalent operation includes store operations and wherein the store operations have the non-consecutive memory accesses; and
generate, using the computing device, the computer-executable instructions causing the at least one pair of the partial-isomorphic statements to perform sequential physical memory accesses.

18. The non-transitory computer readable storage medium of claim 17, further comprising executable instructions that when executed by one or more processors cause the one or more processors to:
identify, using the computing device, in a basic block of the computer program, at least one pair of partial-isomorphic statements having the equivalent operation and same order of operation but causing non-consecutive memory accesses.

19. The non-transitory computer readable storage medium of claim 18, further comprising executable instructions that when executed by one or more processors cause the one or more processors to:
determine, using the computing device, in response to identifying the at least one pair of partial-isomorphic statements, if an actual layout of memory accesses associated with the at least one pair of partial-isomorphic statements is consecutive in physical memory by analyzing the non-consecutive memory accesses of the partial-isomorphic statements.

20. The non-transitory computer readable storage medium of claim 19, further comprising executable instructions that when executed by one or more processors cause the one or more processors to:
sort, using the computing device, in response to determining if the actual layout of memory accesses is consecutive in physical memory, a sequence of memory accesses associated with the at least one pair of partial-isomorphic statements as consecutive based on the actual layout of memory accesses in physical memory; and
mark, using the computing device, prior to generating the computer-executable instructions, the at least one pair of partial-isomorphic statements as extended-isomorphic when the actual layout of memory accesses in physical memory is determined to be consecutive.

* * * * *